United States Patent
Edwards et al.

(10) Patent No.: US 6,893,170 B1
(45) Date of Patent: May 17, 2005

(54) OPTICAL/ELECTRICAL MODULE

(76) Inventors: Phillip J. Edwards, 6721 Positano La., San Jose, CA (US) 95138; Bradley S. Levin, 628 Forest Ave., Apt. C, Palo Alto, CA (US) 94301; Oliver W. Northrup, 1336 Gilmore St., Mountain View, CA (US) 94040; Michael M. O'Toole, 5913 Foligno Way, San Jose, CA (US) 95138; Joseph John Vandenberg, 415 N. Lark Ellen Ave., West Covina, CA (US) 91791

( * ) Notice: Subject to any disclaimer, the term of this patent is extended or adjusted under 35 U.S.C. 154(b) by 161 days.

(21) Appl. No.: 10/285,949

(22) Filed: Nov. 1, 2002

Related U.S. Application Data
(60) Provisional application No. 60/335,307, filed on Nov. 2, 2001.

(51) Int. Cl.[7] ................................................. G02B 6/12
(52) U.S. Cl. .......................... 385/93; 385/88; 385/89; 385/90; 385/91; 385/92; 439/577; 438/422
(58) Field of Search ..................... 385/88–93; 439/577; 438/422

(56) References Cited

U.S. PATENT DOCUMENTS 6,014,476 A * 1/2000 Meyer-Guldner et al. .... 385/14
6,623,176 B2 * 9/2003 Jack et al. .................... 385/80
2004/0101259 A1 * 5/2004 Killan

* cited by examiner

Primary Examiner—John R. Lee
Assistant Examiner—Zia R. Hashmi
(74) Attorney, Agent, or Firm—Parsons & Goltry; Robert A. Parsons; Michael W. Goltry

(57) ABSTRACT

An electro-optic module with an optical coupling efficiency, the module comprising a receptacle assembly, wherein an end of the receptacle assembly is capable of receiving a light guiding element and wherein an opposite end of the receptacle assembly is capable of receiving an optical lens assembly positioned therein the receptacle assembly. An optoelectric package which includes an optoelectronic device is capable of being affixed to the opposite end of the receptacle assembly wherein an optical axis extends from the end to the opposite end of the receptacle assembly such that the light guiding element and the optoelectric device are in communication through a lens included in the optical lens assembly. The optical lens assembly is held fixedly in place against an inward periphery of the receptacle assembly such that a distance between the lens and the optoelectronic device can be adjusted to adjust the optical coupling efficiency.

36 Claims, 1 Drawing Sheet

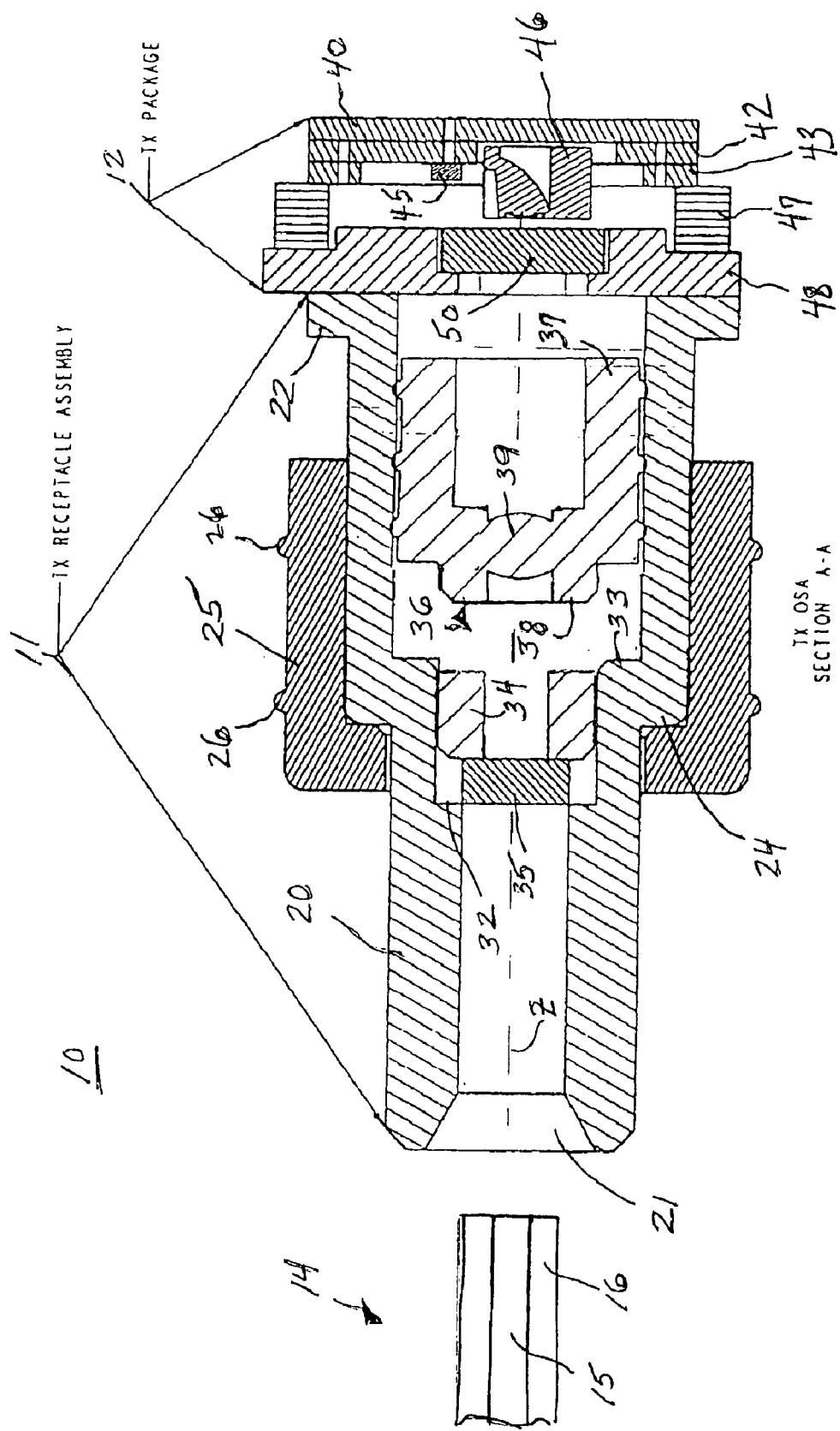

OPTICAL/ELECTRICAL MODULE

CROSS-REFERENCE TO RELATED APPLICATION

This application claims the benefit of U.S. Provisional Application Ser. No. 60/335,307, filed 02 Nov. 2001.

FIELD OF THE INVENTION

This invention relates to optical-to-electrical and electrical-to-optical modules and more particularly to optical alignment features in such modules.

BACKGROUND OF THE INVENTION

At the present time, transmitting data by optical fibers is very popular. Optical fibers have a large number of advantages over the standard wire transmission devices, including much higher transmission frequencies, less losses, and much higher data rates. Generally, in the present communication systems, each optical fiber has a module that includes a transmission channel and a reception channel at each end. One of the pair of channels receives electrical signals, converts the electrical signals to an optical (light) beam by way of a laser or the like and introduces the beam into one end of the optical fiber, which then transmits the modulated optical beam to a similar module at the other end of the optical fiber. The second channel of the module receives modulated optical beams from the optical fiber, conveys the modulated optical beam to a photo diode or the like, which converts the optical beam back to an electrical signal. A problem with this system, however, is the optical coupling efficiency which is highly sensitive to the alignment of the optical fiber and the laser or photo diode.

It would be highly advantageous, therefore, to remedy the foregoing and other deficiencies inherent in the prior art.

Accordingly, it is an object of the present invention to provide a new and improved electro-optic module.

It is an object of the present invention to provide a new and improved electro-optic module which has an improved optical coupling efficiency.

It is another object of the present invention to provide a new and improved electro-optic module which can be actively aligned.

It is still another object of the present invention to provide a new and improved electro-optic module which is easier to optically align to a higher precision.

SUMMARY OF THE INVENTION

To achieve the objects and advantages specified above and others, an electro-optic module with an optical coupling efficiency is disclosed. In a preferred embodiment, the electro-optic module includes a receptacle assembly wherein an end of the receptacle assembly is capable of receiving a light guiding element and wherein an opposite end of the receptacle assembly is capable of receiving an optical lens assembly.

In the preferred embodiment, an optoelectric package which includes an optoelectronic device is affixed to the opposite end of the receptacle assembly wherein an optical axis extends from the end to the opposite end of the receptacle assembly such that the light guiding element and the optoelectronic device are in communication through a lens included in the optical lens assembly. The optical lens assembly is held fixedly in place against an inward periphery of the receptacle assembly such that a distance between the lens and the optoelectronic device can be adjusted to adjust the optical coupling efficiency.

In the preferred embodiment, the receptacle assembly includes an elongated ferrule wherein the ferrule includes a radially outwardly directed step formed in the outer periphery to operate as a stop for a resilient sleeve and further includes at least one radially inwardly directed step. In the preferred embodiment, the resilient sleeve includes an inwardly directed flange formed adjacent to one end so as to engage the radially outwardly directed step of the ferrule and prevent relative longitudinal movement between the ferrule and the resilient sleeve in a direction substantially oriented parallel to the optical axis.

Further, in the preferred embodiment, the resilient sleeve includes radially outwardly directed ribs or protrusions in an outer periphery which are designed to frictionally engage an inner periphery of an opening in a mounting housing. The ferrule and the resilient sleeve are capable of being press-fit into the opening in the mounting housing which frictionally holds the electro-optic module in place.

In one embodiment, the optical lens assembly is formed with radially outwardly projecting ribs or protrusions in an outer periphery so that the optical lens assembly can be press-fit a desired distance along the optical axis within the receptacle assembly. In another embodiment, the optical lens assembly is threadedly engaged within the receptacle assembly to allow for longitudinal adjustments along the optical axis. By allowing precise adjustments of the lens along the optical axis, the optical coupling efficiency can be precisely adjusted.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which the single FIGURE is a sectional view of an electro-optic module in accordance with the present invention.

DETAILED DESCRIPTION OF THE PREFERRED EMBODIMENT

Referring to the FIGURE, a sectional view is illustrated of an electrical-to-optical (hereinafter referred to as electro-optic) module 10 in accordance with the present invention. It will be understood by those skilled in the art that modules of the type discussed herein generally include a pair of channels, one of which receives electrical signals, converts the electrical signals to optical (light) beams by way of a laser or the like and introduces them into one end of an optical fiber, which then transmits the modulated optical beams to external apparatus. The second channel of the module receives modulated optical beams from an optical fiber connected to the external apparatus, conveys the modulated optical beams to a photo diode or the like, which converts them to electrical signals. In the following description, the apparatus and methods are primarily designed for use in the electro-optic channel, which will be discussed with the understanding that the description could be applied to either of the channels in some applications.

In a preferred embodiment, module 10 of the FIGURE includes a receptacle assembly 11 and an optoelectric package 12 aligned and affixed together, as will be disclosed in more detail below. Receptacle assembly 11 is designed to receive an optical fiber 14 in communication therewith, in a manner that will become clear presently. Optical fiber 14 can be a single or multiple mode fiber and includes a glass core 15 and a cladding layer 16, or another suitable light guiding element.

In the preferred embodiment, optoelectric package 12 includes a base or support plate 40 and a mounting plate 42 positioned thereon. One or more spacer rings 43 may be positioned on or incorporated into plate 42 to provide sufficient distance for components mounted to plate 42. In this example, a laser 45 is mounted on the upper surface of mounting plate 42 and positioned to transmit light generated therein to a lens block 46. Alternatively, laser 45 could be a photodiode or the like. Lens block 46 is mounted on mounting plate 42 by some convenient means, such as outwardly extending ears (not shown). In the preferred embodiment, a ring 47 is positioned on spacer ring 43 and a cap or cover 48 is affixed to ring 47.

Generally, the entire assembly, including plate 40, mounting plate 42, spacer rings 43, ring 47 and cover 48 are fixedly attached together by some convenient means, such as welding, gluing, etc. so that laser 45 is enclosed in a hermetically sealed chamber. However, a hermetic seal is not necessary in many embodiments in which the laser or photodiode used is either separately sealed or is not sensitive to atmospheric conditions. Further, it will be understood that while we show one example of the components included in optoelectronic package 12, it is anticipated that optoelectronic package 12 can include other components fixedly attached together which provide essentially the same function.

In the preferred embodiment, a window 50 is sealed in cover 48 so as to be aligned with lens block 46. Lens block 46 redirects light from laser 45 at an angle (i.e. 90°) out through window 50 and may include one or more lenses or optical surfaces. Further, lens block 46 may be molded from plastic for convenience in manufacturing. In some specific applications, the laser may emit directly through window 50 and in these applications the first lens may be positioned between window 50 and the laser or may be incorporated into window 50.

In the preferred embodiment, receptacle assembly 11 includes an elongated cylindrical ferrule 20 having an end 21 defining a fiber receiving opening and a mounting flange 22 at the opposite end. Ferrule 20 has a radially outwardly directed step 24 formed in the outer periphery to operate as a stop for a resilient sleeve 25. Sleeve 25 has an inwardly directed flange formed adjacent one end so as to engage step 24 and prevent relative longitudinal movement between ferrule 20 and sleeve 25. Sleeve 25 also includes radially outwardly directed ribs or protrusions 26 in the outer periphery which are designed to frictionally engage the inner periphery of a cylindrical opening in a mounting housing (not shown). Thus, to easily and conveniently mount module 10 in the housing, ferrule 20 with sleeve 25 engaged thereover is press-fit into the cylindrical opening in the housing and frictionally holds module 10 in place. Preferably, sleeve 25 is formed, completely or partially, of some convenient resilient material and may be electrically conductive or non-conductive as required in the specific application.

Progressing from end 21 toward flange 22, ferrule 20 has two radially inwardly directed steps 32 and 33. In the preferred embodiment, step 32 provides a surface or stop for the mounting of an optical spacer 35 and step 33 provides a limit or an extreme stop in the positioning of an optical lens assembly 36. A retaining ring 34 is frictionally engaged in ferrule 20, generally between steps 32 and 33, to hold optical spacer 35 fixedly in position against step 32. In this preferred embodiment, optical fiber 14 is inserted into ferrule 20 so that glass core 15 buts against spacer 35, which substantially reduces or suppresses return reflections.

In the preferred embodiment, lens assembly 36 includes a cylindrically shaped body with an outer diameter slightly smaller than the inner diameter of ferrule 20. The cylindrically shaped body defines a central opening for the transmission of light therethrough from an end 37 to an opposite end 38 along an optical axis Z. A lens 39 (which may include one or more lens elements) is integrally formed in the central opening of the cylindrically shaped body. In one embodiment, lens assembly 36 is formed with radially outwardly projecting ribs or protrusions in the outer periphery so that it can be press-fit a desired distance into ferrule 20. In another embodiment, lens assembly 36 is threadedly engaged in ferrule 20 to allow for very small longitudinal adjustments, as will be described in more detail presently.

In the preferred embodiment, lens assembly 36 is formed of plastic and may be, for example, molded to simplify manufacturing of module 10. It should be understood that the term "plastic" is used herein as a generic term to describe any non-glass optical material that operates to transmit optical beams of interest therethrough and which can be conveniently formed into lenses and the like. For example, in most optical modules used at the present time the optical beams are generated by a laser that operates in the infra-red band and any materials that transmit this light, including some oxides and nitrides, come within this definition.

In the preferred embodiment, optoelectric package 12 is affixed to receptacle assembly 11 with flange 22 of ferrule 20 butting against the exposed surface of cover 48. Further, optoelectric package 12 is optically aligned with receptacle assembly 11 so that light from laser 45 is directed into core 15 of optical fiber 14. This alignment can be accomplished in different ways but one reliable method is known as active alignment. In the active alignment process, laser 45 is activated and receptacle assembly 11 is positioned approximately over optoelectric package 12. The light in optical fiber 14 is measured and the alignment is adjusted for maximum light. When maximum light is measured, alignment has been achieved and receptacle assembly 11 is fixed to optoelectric package 12 by some convenient means, such as welding or adhesive.

Referring generally to the components of module 10 for purposes of orientation, laser 45 supplies light through optical block 46, window 50, lens 39, and spacer 35 to core 15 of optical fiber 14. The main purpose of the optics in module 10 is to make sure that light from laser 45 is generally collimated (parallel beams) along optical axis Z and to focus the collimated beam finally on the end of core 15 of optical fiber 14. In this example, the lens system includes at least two lenses or lens elements, 46 and 39, that provide the collimating and focusing. Generally, the distance between laser 45 and optical block 46 is critical, since most of the optical power is in the first curved lens and the second lens simply provides minor adjustment. If the placement of laser 45 and optical block 46 is done to a high accuracy (e.g. ±1 micron) with expensive placement equipment, then lens 39 may be placed in a fixed position. If optical block 46 is very accurately positioned, the distances between lens 39 and spacer 35 and between lens 39 and optical block 46 are not critical because the light is collimated and slight variances in position simply produce a small amount of light loss.

However, the present invention incorporates a more cost effective apparatus and method in which optical block 46 and lens assembly 36 are placed with standard placement equipment to a greatly relieved tolerance (e.g. approximately ±10 microns). Lens assembly 36 is then moved to compensate for any less than ideal spacing that may occur between laser 45, optical block 46, lens 39, and spacer 35. The correct positioning of lens assembly 36 is accomplished by a simple mechanical fixture which is adjustable over a required range. As mentioned above, lens assembly 36 may be frictionally engaged in ferrule 20, in which case it is simply moved axially along the optical axis Z, or it may be threadedly engaged in ferrule 20, in which case it is rotated to move it farther in or out of ferrule 20. In either case, the power of the two lens system is set so that lens 39 may be moved over a relatively large distance (e.g. approximately several hundred microns) to compensate for any mispositioning, generally of a few microns, between laser 45 and optical block 46.

It will be understood that other methods and apparatus for achieving relative movement of lens assembly 36 within ferrule 20 may be devised and the described apparatus and methods are intended to illustrate the concept. Thus, apparatus and methods for achieving cost effective fabrication and assembly of an electro-optic module are disclosed wherein the initial positioning of optical block 36 and lens 39, for example, is less critical so that assembly tolerances are relaxed and manufacturing is easier and less costly.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An electro-optic module with an optical coupling efficiency, the module comprising:
    a cylindrical receptacle assembly having a longitudinally extending opening therethrough with an end and an opposite end;
    wherein the end of the receptacle assembly is capable of receiving a light guiding element in the longitudinally extending opening;
    an optical lens assembly positioned within the longitudinally extending opening of the receptacle assembly adjacent the opposite end and longitudinally movable from the opposite end, the optical lens assembly including a lens;
    an optoelectric package including an optoelectronic device affixed to the opposite end of the receptacle assembly;
    wherein an optical axis extends through the longitudinally extending opening from the end to the opposite end of the receptacle assembly such that the light guiding element and the optoelectronic device are in communication through the lens included in the optical lens assembly; and
    wherein the longitudinally module optical lens assembly is held fixedly in place against an inward periphery of the receptacle assembly such that a distance between the lens and the optoelectronic device can be adjusted to adjust the optical coupling efficiency.

2. A module as claimed in claim 1 wherein the optoelectric package further includes:
    a window positioned in a cover and held so that the optical axis is directed therethrough; and
    a combination mounting plate and support plate positioned proximate to the window, the combination mounting plate and support plate holding the optoelectronic device and a lens block fixedly in place, and the lens block being positioned in alignment with the window and the optical axis such that the light directed through the window along the optical axis is substantially directed towards the optoelectronic device.

3. A module as claimed in claim 1 wherein the optical lens assembly is formed with radially outwardly projecting ribs or protrusions in an outer periphery so that the optical lens assembly can be press-fit a desired distance along the optical axis within the receptacle assembly.

4. A module as claimed in claim 1 wherein the optical lens assembly is threadedly engaged within the receptacle assembly to allow for longitudinal adjustments along the optical axis.

5. A module as claimed in claim 2 wherein at least one of the lens block and the optical lens assembly includes at least one of plastic or another suitable material transparent at a wavelength of operation which can be molded.

6. A module as claimed in claim 1 wherein the receptacle assembly includes an elongated ferrule.

7. A module as claimed in claim 6 wherein the ferrule includes a radially outwardly directed step formed in the outer periphery to operate as a stop for a resilient sleeve.

8. A module as claimed in claim 6 wherein the ferrule includes at least one radially inwardly directed step.

9. A module as claimed in claim 7 wherein the resilient sleeve includes an inwardly directed flange formed adjacent to one end so as to engage the radially outwardly directed step of the ferrule and prevent relative longitudinal movement between the ferrule and the resilient sleeve in a direction substantially oriented parallel to the optical axis.

10. A module as claimed in claim 7 wherein the resilient sleeve includes radially outwardly directed ribs or protrusions in an outer periphery which are designed to frictionally engage an inner periphery of an opening in a mounting housing.

11. A module as claimed in claim 10 wherein the ferrule and the resilient sleeve are capable of being press-fit into the opening in the mounting housing which frictionally holds the electro-optic module in place.

12. A module as claimed in claim 8 wherein a first of the at least one radially inwardly directed steps of the ferrule provides a surface or stop for the mounting of an optical spacer and a second of the at least one radially inwardly directed steps provides a limit or an extreme stop in the positioning of the optical lens assembly.

13. A module as claimed in claim 12 wherein a retaining ring is frictionally engaged within the ferrule proximate to the first of the at least one radially inwardly directed steps to hold the optical spacer fixedly in position against the first of the at least one radially inwardly directed steps.

14. A module as claimed in claim 13 wherein the light guiding element includes a glass core which is capable of being inserted into the ferrule such that the glass core buts against the optical spacer to substantially reduce or suppress return reflections.

15. An electro-optic module with an optical coupling efficiency, the module comprising:
    a receptacle assembly which includes an elongated cylindrical ferrule having a longitudinally extending opening therethrough with an end and an opposite end;
    wherein the end of the elongated cylindrical ferrule is capable of receiving one end of an optical fiber;
    an optical lens assembly positioned within the elongated cylindrical ferrule adjacent the opposite end and longitudinally movable from the opposite end, the optical lens assembly including a lens;

an optoelectric package including an optoelectronic device being affixed to the opposite end of the elongated cylindrical ferrule;

wherein an optical axis extends from the end to the opposite end of the elongated cylindrical ferrule such that the optical fiber and the optoelectronic device are in communication through the lens included in the optical lens assembly; and wherein the longitudinally movable optical lens assembly is held fixedly in place against an inward periphery of the elongated cylindrical ferrule such that a distance between the lens and the optoelectronic device can be adjusted to adjust the optical coupling efficiency.

16. A module as claimed in claim 15 wherein the optoelectric package further includes:

a cap or cover with a window;

a ring positioned to hold the window against the cap or cover;

a spacer ring with a thickness positioned adjacent to the ring;

a mounting plate positioned adjacent to the spacer ring wherein the mounting plate is capable of holding the optoelectronic device; and a support plate positioned adjacent to the mounting plate wherein the support plate is capable of holding a lens block fixedly in place and aligned with the optical axis such that light directed along the optical axis is substantially directed by the lens block towards the optoelectronic device.

17. A module as claimed in claim 15 wherein the optical lens assembly is formed with radially outwardly projecting ribs or protrusions in an outer periphery so that the optical lens assembly can be press-fit a desired distance along the optical axis within the receptacle assembly.

18. A module as claimed in claim 15 wherein the optical lens assembly is threadedly engaged within the receptacle assembly to allow for longitudinal adjustments along the optical axis.

19. A module as claimed in claim 16 wherein the thickness of the spacer ring is chosen to obtain a desired optical alignment and optical coupling efficiency between the optoelectronic device and the light guiding element.

20. A module as claimed in claim 16 wherein the support plate, mounting plate, spacer ring, ring, window, and cap or cover are fixedly attached together by some convenient means, such as welding, gluing, or the like, such that the optoelectronic device is substantially enclosed in a hermetically sealed chamber.

21. A method of adjusting an optical coupling efficiency of an electro-optic module comprising the steps of:

providing a cylindrical receptacle assembly having a longitudinally extending opening therethrough with an end and an opposite end;

positioning a light guiding element within the longitudinally extending opening at the end of the receptacle assembly;

providing a longitudinally movable optical lens assembly and movably positioning the longitudinally movable optical lens assembly within the longitudinally extending opening at the opposite end of the receptacle assembly;

affixing an optoelectric package to the opposite end of the receptacle assembly wherein the optoelectric package includes an optoelectronic device and wherein an optical axis extends from the end to the opposite end of the receptacle assembly such that the light guiding element and the optoelectronic device are in communication through the lens included in the optical lens assembly and wherein the optical lens assembly is held fixedly in place against an inward periphery of the receptacle assembly such that a distance between the lens and the optoelectronic device can be adjusted to adjust the optical coupling efficiency.

22. A method as claimed in claim 21 wherein the optoelectric package further includes:

a cap or cover with a window positioned adjacent to the opposite end of the receptacle assembly;

a ring positioned to hold the window against the cap or cover;

a spacer ring with a thickness positioned adjacent to the ring;

a mounting plate positioned adjacent to the spacer ring wherein the mounting plate is capable of holding the optoelectronic device; and a support plate positioned adjacent to the mounting plate wherein the support plate is capable of holding a lens block fixedly in place and aligned with the optical axis such that light directed along the optical axis is substantially directed towards the optoelectronic device.

23. A method as claimed in claim 21 further including the step of providing the optical lens assembly with radially outwardly projecting ribs or protrusions in the outer periphery so that the optical lens assembly is press-fit a desired distance along the optical axis into the receptacle assembly.

24. A method as claimed in claim 21 further including the step of providing the optical lens assembly such that the optical lens assembly is threadedly engaged in the receptacle assembly to allow for longitudinal adjustments along the optical axis.

25. A method as claimed in claim 22 further including the step of choosing the thickness of the spacer ring to obtain a desired optical alignment and optical coupling efficiency between the optoelectronic device and the light guiding element.

26. A method as claimed in claim 22 further including the step of fixedly attaching the support plate, mounting plate, spacer ring, ring, window, and cap or cover together by some convenient means, such as welding, gluing, or the like, such that the optoelectronic device is substantially enclosed in a hermetically sealed chamber.

27. A method as claimed in claim 22 further including the step of providing at least one of the lens block and the optical lens assembly with at least one of plastic or another suitably transparent material at a wavelength of operation which can be molded.

28. A method as claimed in claim 21 further including the step of providing the receptacle assembly with an elongated ferrule.

29. A method as claimed in claim 28 further including the step of providing the ferrule with a radially outwardly directed step formed in the outer periphery to operate as a stop for a resilient sleeve.

30. A method as claimed in claim 28 further including the step of providing the ferrule with at least one radially inwardly directed step.

31. A method as claimed in claim 29 further including the step of providing the resilient sleeve with an inwardly directed flange formed adjacent to one end so as to engage the radially outwardly directed step of the ferrule and prevent relative longitudinal movement between the ferrule and the resilient sleeve in a direction substantially oriented parallel to the optical axis.

32. A method as claimed in claim 29 further including the step of providing the resilient sleeve with radially outwardly directed ribs or protrusions in the outer periphery which are designed to frictionally engage the inner periphery of an opening in a mounting housing.

33. A method as claimed in claim 32 further including the step of press-fitting the mounting housing, the ferrule, and the resilient sleeve into the opening in the mounting housing which frictionally holds the electro-optic module in place.

34. A method as claimed in claim 30 further including the step of providing a first of the at least one radially inwardly directed steps of the ferrule with a surface or stop for the mounting of an optical spacer and providing a second of the at least one radially inwardly directed steps with a limit or an extreme stop in the positioning of the optical lens assembly.

35. A method as claimed in claim 34 further including the step of providing a retaining ring which is frictionally engaged within the ferrule proximate to the first of the at least one radially inwardly directed step to hold the optical spacer fixedly in position against the first of the at least one radially inwardly directed step.

36. A method as claimed in claim 35 further including the step of providing the light guiding element with a glass core which is capable of being inserted into the ferrule such that the glass core buts against the optical spacer to substantially reduce or suppress return reflections.

* * * * *

UNITED STATES PATENT AND TRADEMARK OFFICE
CERTIFICATE OF CORRECTION

PATENT NO. : 6,893,170 B1
DATED : May 17, 2005
INVENTOR(S) : Edwards, Phillip J. et al.

It is certified that error appears in the above-identified patent and that said Letters Patent is hereby corrected as shown below:

Column 5,
Line 59, replace "module" with -- movable --.

Signed and Sealed this

Fourth Day of October, 2005

JON W. DUDAS
*Director of the United States Patent and Trademark Office*